United States Patent Office 2,840,613
Patented June 24, 1958

2,840,613
PREPARATION OF ORGANIC COMPOUNDS

Benjamin Wilson Howk, West Chester, Pa., and John Carl Sauer, Wilmington, Del., assignors to E. I. du Pont de Nemours and Company, Wilmington, Del., a corporation of Delaware No Drawing. Application April 30, 1956
Serial No. 581,365
4 Claims. (Cl. 260—609)

This invention relates to the preparation of acetylenic acetals and orthoesters, including the thio analogs, and is more particularly concerned with a new catalytic process for preparing such compounds directly from an alkyne by reaction with an orthoester or orthothioester, and with new compounds obtained.

Acetylenic acetals of certain types are known but previous methods of preparation have involved dehydrohalogenation of halogen-substituted hydrocarbon acetals or reaction of acetylenic Grignard reagent with an orthoester. These methods have not been commercially desirable, have limited applicability, and require intermediates which are often difficult to handle, expensive, or both. A practical and less expensive method for preparing acetals and orthoesters of acetylene and other alkynes would be of fundamental importance.

It is an object of this invention to provide a method for preparing acetals and orthoesters directly from alkynes. Another object is to provide new and useful acetylenic acetals and thioacetals which were not previously available. Other objects will become apparent from the specification and claims.

In accordance with this invention it has been found that an alkyne will react with an orthoester in the presence of an alkaline earth metal catalyst selected from the salts of magnesium, mercury, zinc and cadmium. The reaction takes place in accordance with the following general equation,

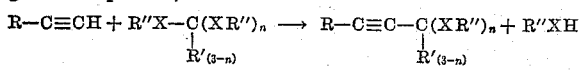

wherein R and R' are selected from the group consisting of aliphatically saturated monovalent hydrocarbon radicals and hydrogen, R'' is an aliphatically saturated monovalent hydrocarbon radical, X is selected from the group consisting of oxygen and sulfur, and $n$ is an integer from 2 to 3. When the alkyne is acetylene the reaction can be continued to replace both acetylenic hydrogens and give a compound of the general formula

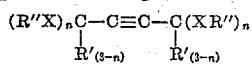

wherein the symbols are as defined above.

This invention accordingly provides a new catalytic method for preparing alkynyl acetals and orthoesters, employing alkynes of the aforementioned kind as reactants with orthoesters. It also makes available certain new alkynyl acetals and thioacetals which were not accessible by hitherto known methods.

The above compounds are prepared by reacting an alkyne of the formula $RC{\equiv}CH$, in which R has the previously indicated meaning, with an orthoester of the formula previously indicated, in the presence of a catalytic amount of a salt of a group II metal of the class of magnesium, zinc, mercury, and cadmium. In a preferred embodiment of the invention, a reactor fitted with external means for heating and agitation is charged with the orthoester and catalyst. A predetermined amount of the acetylene is then added and the charge maintained at 0° to 200° C. until there is no further reaction. The reaction mixture is thereafter distilled, or otherwise treated, to isolate the desired product.

The examples which follow illustrate specific embodiments of this invention.

EXAMPLE I

A reactor was charged with phenylacetylene (34 g.) and triethyl orthoformate (49.3 g.). To this mixture there was added 1.5 g. of commercial grade anhydrous zinc chloride and the reactor attached to a 16-inch fractionating column containing platinum gauze. As the reaction mixture was heated, ethanol, boiling point 78° C., was removed at the head of the still. During a 3-hour reaction time there was removed, by distillation, 12.4 g. of ethanol (theoretical amount is 15.3 g.). The reaction mixture was taken up in ether, washed with aqueous potassium carbonate, and dried over anhydrous potassium carbonate. Distillation yielded the following fractions:

| Fraction | B. P., ° C. | Wgt., g. | Remarks |
|---|---|---|---|
| 1 | 33–95/5 mm | 8.0 | $n_D^{25}$ 1.4511 (almost all at 33° C./5). |
| 2 | 93–5/5 mm.–84/3 mm | 35.0 | $n_D^{25}$ 1.5150. |
| 3 | 93–8/3 mm | 1.3 | $n_D^{25}$ 1.5160. |

The boiling point and refractive index of cut (2), above, are identical to the corresponding values for an authentic sample of acetal made from a phenylacetylenic Grignard reagent and triethyl orthoformate according to Moureau, Compt. rend. 133, 106.

The procedure described above was repeated with the amount and type of catalyst and reaction times indicated in Table I. While the yields varied considerably, the results illustrate that any common salts of zinc, mercury, cadmium or magnesium is effective as a catalyst for the reaction, and that a catalyst is essential.

Table I
CATALYTIC SYNTHESIS OF ACETYLENIC ACETALS

| Catalyst | Time, hrs. | Ethanol g. | Yield of Acetal, percent |
|---|---|---|---|
| 1. None | 2.0 | None | None |
| 2. 1.5 g. ZnCl₂ (Comm'l) | 3.5 | 12.4 | 53.5 |
| 3. 8.2 g. ZnCl₂* | 3.2 |  | 28.3 |
| 4. 1.6 g. ZnCl₂ (Comm'l) | 1.7 | 14.0 | 64.0 |
| 5. 2.0 g. ZnBr₂ | 3.0 | 28.9 | 11.8 |
| 6. 2.0 g. ZnI₂ | 0.4 | 15.5 | 71 |
| 7. 2.0 g. Zn(NO₃)₂ | 0.4 | 15.5 | 71 |
| 8. 2.0 g. ZnSO₄ | 5.7 | 8.0 | 29.4 |
| 9. 2.0 g. Zn molybdite | 4.7 | 10.0 | 7.4 |
| 10. 2.0 g. Zn(OAc)₂·2H₂O | 3.5 | 8.8 | 37.1 |
| 11. 2.0 g. (C₁₇H₃₅COO)₂Zn | 5.5 | 29.5 | 6.3 |
| 12. 2.0 g. Zn formate | 5.0 | 8.7 | 31 |
| 13. 2.0 g. HgBr₂ | 7.0 | 10.5 | 20.6 |
| 14. 2.0 g. CdCl₂ | 9.0 | 5.0 | 22.5 |
| 15. 2.0 g. CdI₂ | 3.0 | 16.0 | 72.3 |
| 16. 2.0 g. CdI₂ | 1.5 | 7.4 | 45.5 |
| 17. 2.0 g. MgCl₂ | 3.0 | 14 | 8.1 |

*Freshly fused and heated sufficiently to drive off all water.

EXAMPLE II

By the procedure described in example I, triethyl orthoacetate (64.8 g.) and phenylacetylene (40.8 g.) were heated in the presence of zinc chloride (2 g.). During a 3-hour and 40 minutes reaction time, there was removed by distillation a total of 29 g. of distillate, boiling largely at 77° C. Infrared analysis indicated that this distillate was mostly ethanol, with some ethyl acetate. The reaction mixture was treated with 1.5 ml. of 25% alcoholic potassium hydroxide and distilled as follows:

| Fraction | B. P., ° C. | Wgt., g. |
|---|---|---|
| 1 | 46/20 mm.–82/2 mm | 7.5 |
| 2 | 82/2 mm.–92/3 mm | 33.3 |
| 3 | 138/10 mm.–240/15 mm | 5.7 |

Redistillation in a highly efficient still gave 20 g. of the acetylenic acetal, boiling point 92° C./3 mm., $n_D^{25}$ 1.5115.

*Analysis.*—Calc'd. for $C_{14}H_{18}O_2$: C, 77.00; H, 8.31. Found: C, 76.81; H, 8.31.

The infrared spectrum of the acetal shows internal triple unsaturation, a monosubstituted aromatic structure, and characteristic ether absorption of the acetal function. A hydrazone was prepared by reacting the acetal with an aqueous acidic solution of 2,4-dinitrophenylhydrazine. The hydrazone melted at 195–198° C. after one recrystallization from an ethyl acetate/ethanol mixture.

*Analysis.*—Calc'd. for $C_{16}H_{12}N_4O_4$: C, 59.30; H, 3.70; N, 17.30. Found: C, 59.29; H, 3.68; N, 17.01.

EXAMPLE III

A reactor was charged with tetraethyl orthocarbonate (38.4 g.), phenylacetylene (20.4 g.), and 2 g. of zinc chloride. The reaction was carried out as described in Example I and during one hour and fifty minutes there was obtained by distillation about 8 g. of distillate, boiling point 68° to 80° C., which consisted chiefly of ethanol with a small amount of diethyl carbonate (based on infrared analysis). The reaction mixture was cooled, taken up with ether and washed with dilute potassium carbonate. The ether layer was dried over anhydrous potassium carbonate and distilled. After removing the ether the residual liquid distilled as follows:

| Fraction | B. P., °C. | Wtg., g. | Remarks |
|---|---|---|---|
| 1 | 42–50/20 mm | 13.5 | $n_D^{25}$ 1.4487 |
| 2 | 51/20 mm.–120/5 mm | 22.0 | |

Fraction 2 above was redistilled in a precision still and the fraction distilling at 126° C./5 mm. weighed 7.0 g., $n_D^{25}$ 1.5004. This material is the acetylenic orthoester corresponding to $C_6H_5C{\equiv}C{-}C(OEt)_3$.

*Analysis.*—Calc'd. for $C_{15}H_{20}O_3$: C, 72.60; H, 8.10. Found: C, 71.88, 71.99; H, 8.26, 7.84.

The infrared spectrum confirms the assigned structure with internal triple bond, monosubstituted aromatic group and strong absorption for the orthoester function.

EXAMPLE IV

A mixture of 41 g. of hexyne-1, 74 g. of triethyl orthoformate, 5 g. of zinc iodide and 1 g. of zinc chloride was placed in a pressure vessel and heated under autogenous pressure for 4 hours at 175° C. By working up the product as described previously, there was obtained 14.1 g. of 1,1-diethoxyheptyne-2, distilling at 90° C./10 mm., $n_D^{25}$ 1.4368.

*Analysis.*—Calc'd. for $C_{11}H_{20}O_2$: C, 71.70; H, 10.90. Found: C, 70.67; H, 10.56.

The infrared spectrum showed absorption at 4.45μ for acetylenic triple bond and confirmed the acetylenic acetal structure.

EXAMPLE V

A mixture of 22.5 g. of cyclohexylpropyne-1 and 27.2 g. of triethyl orthoformate was placed in a flask along with 1.5 g. of zinc iodide and 1.0 g. of zinc chloride. During 1.8 hours the take-off temperature at the still-head was 76° to 82° C. (8.4 g.). Residual reaction mixture was treated with 2 ml. of 25% alcoholic potassium hydroxide and distilled. The fraction distilling at 98–100° C./3 mm. weighed 22.7 g., $n_D^{25}$ 1.4623.

*Analysis.*—Calc'd. for $C_{14}H_{24}O_2$: C, 75.1; H, 10.7. Found: C, 75.13; H, 10.80.

EXAMPLE VI

A mixture of 20.4 g. of phenylacetylene and 39.2 g. of triethyl orthothioformate was placed in a reaction vessel, along with 2 g. of zinc chloride. During one hour the take-off temperature varied between 36–42° C. and 9.0 g. of ethyl mercaptan was collected. The residual liquid in the reactor was treated with 1 ml. of 25% alcoholic potassium hydroxide and distilled. Twenty grams of crude distillate, B. P. 20–122° C./3–4 mm., was collected. The product from this experiment was combined with a duplicate run and the distillates were composited for a more careful fractionation. In this way, 1 g. of pure 1,1-thioethyl-3-phenylpropyne-2, B. P. 133° C./2 mm., $n_D^{25}$ 1.6038, was collected.

*Analysis.*—Calc'd. for $C_{13}H_{16}S_2$: C, 66.30; H, 6.80; S, 27.1. Found: C, 66.82; H, 7.41; S, 26.2.

The ultraviolet spectrum of the above product showed specific absorbance maxima at $k_{2900\,A.}=30$ and $$k_{2250\,A.}=52$$

indicative of conjugated unsaturation adjacent to a phenyl group.

EXAMPLE VII

A pressure reactor was charged with 125 ml. of triethyl orthoformate, 3 g. of zinc iodide, and 2 g. of zinc chloride. By means of acetylene injection the reaction was carried out at a gauge pressure varying from 170–350 lb./sq. in. during 8.3 hours at 116–182° C. An analogous run was made and composited for work-up. Four milliliters of 25% alcoholic potassium hydroxide was added and the reaction mixture distilled. A fraction distilling at 55–56° C./30 mm. weighed 9 g., $n_D^{25}$ 1.3923. This fraction contained primarily the acetal of propiolaldehyde, as judged by infrared analysis. Also the 2,4-dinitrophenylhydrazone of propiolaldehyde was readily made by adding this acetal to a dilute acid solution of 2,4-dinitrophenylhydrazine. This hydrazone derivative melted at 110–118° C. and its infrared spectrum showed the expected absorption for acetylenic hydrogen. Another fraction distilling at 96–99° C./5 mm. weighed 36 g., $n_D^{25}$ 1.4306. There was no change in refractive index during the distillation of this fraction. This material was the diacetal 1,1,4,4-tetraethoxybutyne-2,

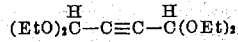

This structure was confirmed by infrared and Raman spectra. The former spectrum showed the acetal structure; a symmetrically located triple bond does not absorb in the infrared and no absorption was noted. The Raman spectrum showed a peak at 2260$^{cm-1}$, indicative of acetylenic unsaturation.

*Analysis.*—Calc'd. for $C_{12}H_{22}O_4$: C, 62.50; H, 9.60. Found: C, 62.37; H, 9.84.

EXAMPLE VIII

The acetylenic diacetal of Example VII was selectively hydrogenated to the maleicaldehyde derivative.

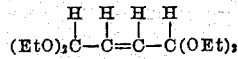

by catalytic hydrogenation in ethanol solvent with a lead-poisoned palladium-on-calcium carbonate catalyst. The reduced product distilled at 64° C./3 mm., $n_D^{25}$ 1.4242.

*Analysis.*—Calc'd. for $C_{12}H_{24}O_4$: C, 62.40; H, 10.30. Found: C, 62.95; H, 10.52.

The Raman spectrum clearly showed the presence of carbon:carbon double bond and the absence of triple bond.

A mixture containing 45 g. of freshly distilled styrene, 5 g. of the acetal, described above, 200 g. of benzene, and 0.3 g. of 2,2'-azobis(2-methylpropionitrile) was heated for 5 hours at 75° C. After removing most of the benzene the resulting polymer was extremely viscous. The viscous polymer was again heated 4 hours at 75° C. after adding another 0.3 g. of 2,2'-azobis(2-methylpropionitrile). The polymer was a crumbly solid which was thoroughly steam-distilled to remove solvent and unreacted monomers. The resulting copolymer weighed 30 g. after drying at 60° C. for 18 hours. A benzene solution of this polymer was flowed on a glass substrate and the film after evaporation of the solvent was very clear and hard. Similarly, a film was pressed in a Carver press at 5000 lb./sq. in. and 100° C. Analysis of copolymer—Found: C, 88.99; H, 8.11. Based on the carbon/hydrogen analysis, this copolymer contains 10.5% of the diacetal by weight.

EXAMPLE IX

A mixture of 25 g. of trimethyl ortho-n-valerate, 15.8 g. of phenylacetylene, 1 g. of zinc iodide, and 1 g. of zinc chloride was charged into a flask and the mixture heated as described in Example VI. Nine grams of distillate, B. P. 56–70° C., was collected during 3 hours. This low boiling distillate was mainly methanol according to the infrared spectrum. The residual liquid was worked up as described in previous example and 14 g. of the acetylenic ketal, B. P. 121–124° C./5 mm., $n_D^{25}$ 1.5339, was collected.

*Analysis.*—Calc'd. for $C_{15}H_{20}O_2$: C, 77.60; H, 8.60. Found: C, 78.94; H, 8.31.

This material exhibited a similar infrared spectrum to the product of Example II. It was converted by 2,4-dinitrophenylhydrazine into the expected 2,4-dinitrophenylhydrazone which melted at 130–131° C. after recrystallization from an ethyl acetate/ethanol mixture.

*Analysis.*—Calc'd. for $C_{19}H_{18}O_4N_4$: C, 62.40; H, 4.90; N, 15.30. Found: C, 62.09; H, 4.96; N, 15.04.

Orthoesters which can be substituted for those of the examples are those of formula

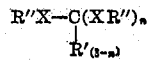

in which R', R'', X, and $n$ have the previously indicated meanings. When X is oxygen, $n$ is 3, and R'' is a monovalent hydrocarbon radical, the esters are orthocarbonates. Specific examples are ethyl orthocarbonate, propyl orthocarbonate, isobutyl orthocarbonate, phenyl orthocarbonate, cyclohexyl orthocarbonate, and the like. When R' is hydrogen, X is oxygen, $n$ is 2, and R'' is a monovalent hydrocarbon radical, the esters are orthoformates. Specific examples are ethyl orthoformate, decyl orthoformate, cyclohexyl orthoformate, benzyl orthoformate, and the like. When R' and R'' are monovalent hydrocarbon radicals, X is oxygen, and $n$ is 2, the esters are orthocarboxylates higher than orthoformates. Specific examples are methyl orthoacetate, methyl orthopropionate, methyl orthovalerate, ethyl orthoacetate, butyl orthoisovalerate, dodecyl orthopropionate, cyclohexyl orthoacetate, benzyl orthobutyrate, phenyl orthoisobutyrate, methyl orthobenzoate, butyl orthotoluate, propyl orthohexahydrobenzoate, dodecyl orthomethylhexahydrobenzoate, and the like. When X in the above formula is sulfur, the esters are those of the correspondig thioortho acids. Examples of such orthoesters are ethyl orthothioformate, butyl orthothioacetate, amyl orthothiovalerate, methyl orthothiobenzoate, methylorthothiocarbonate, orthothiohexahydrobenzoate, and the like.

Employing the acetylenes and orthoesters listed in the first and second columns of Table II in the process of Example I, there are obtained the products listed in the third column.

*Table II*

| Reactants | | Products |
|---|---|---|
| Acetylene | Ester | |
| Acetylene | Triethyl orthoformate | 1,1,4,4-Tetraethoxybutyne-2 and 3,3-diethoxypropyne-1. |
| Do | Triethyl orthothioformate | 1,1,4,4 - Tetrathioethylbutyne-2 and 3,3-diethioethylpropyne-1. |
| Do | Triethyl orthopropionate | 2,2,5,5-Tetraethoxyhexyne-3 and 3,3-diethoxybutyne-1. |
| Do | Triethyl orthobenzoate | 1,4-Diphenyl-1,1,4,4-tetraethoxybutyne-2 and 3,3-diethoxy-3-phenylpropyne-1. |
| Do | Triethyl orthothiobenzoate | 1,4-Diphenyl-1,1,4,4-tetrathioethylbutyne-2 and 3,3-dithioethyl-3-phenylpropyne-1. |
| Do | Tetraethyl orthocarbonate | 1,1,1,3,3,3-Hexaethoxybutyne-2 and 3,3,3-triethoxypropyne-1. |
| Do | Tetraethyl orthothiocarbonate | 1,1,1,3,3,3-Hexathioethylbutyne-2 and 3,3,3-trithioethylpropyne-1. |
| Phenylacetylene | Triethyl orthoformate | 1-Phenyl-3,3-diethoxypropyne-1. |
| Do | Triethyl orthothioformate | 1-Phenyl-3,3-dithioethylpropyne-1. |
| Do | Triethyl orthoacetate | 1-Phenyl-3,3-diethoxybutyne-1. |
| Do | Trimethyl ortho-n-valerate | 1-Phenyl-3,3-diethoxyheptyne-1. |
| Do | Triethyl orthobenzoate | 1,3-Diphenyl-3,3-diethoxypropyne-1. |
| Do | Triethyl orthothiobenzoate | 1,3-Diphenyl-3,3-dithioethylpropyne-1. |
| Do | Tetraethyl orthocarbonate | 1-Phenyl-3,3,3-triethoxypropyne-1. |
| Do | Tetraethyl orthothiocarbonate | 1-Phenyl-3,3,3-trithioethylpropyne-1. |
| n-Butylacetylene | Triethyl orthoformate | 1,1-Diethoxyheptyne-2. |
| Do | Triethyl orthothioformate | 1,1-Dithioethylheptyne-2. |
| Do | Triethyl orthoacetate | 2,2-Diethoxyoctyne-3. |
| Do | Triethyl orthobenzoate | 1-Phenyl-2,2-diethoxyheptyne-2. |
| Do | Triethyl orthothiobenzoate | 1-Phenyl-2,2-dithioethylheptyne-2. |
| Do | Tetraethyl orthocarbonate | 1,1,1-Triethoxyheptyne-2. |
| Do | Tetraethyl orthothiocarbonate | 1,1,1-Trithioethylheptyne-2. |
| Cyclohexylacetylene | Triethyl orthoformate | 1-Cyclohexyl-3,3-diethoxypropyne-1. |
| Cyclohexylpropyne-1 | ___do___ | 1-Cyclohexyl-4,4-diethoxybutyne-2. |
| Cyclohexylacetylene | Triethyl orthothioformate | 1-Cyclohexyl-3,3-dithioethylpropyne-1. |
| Do | Triethyl ortho-n-valerate | 1-Cyclohexyl-3,3-diethoxyheptyne-1. |
| Do | Triethyl orthobenzoate | 1 - Cyclohexyl - 3 - phenyl-3,3-diethoxypropyne-1. |
| Do | Triethyl orthothiobenzoate | 1 - Cyclohexyl - 3 - phenyl-3,3-dithioethylpropyne-1. |
| Do | Tetraethyl orthocarbonate | 1-Cyclohexyl-3,3,3-triethoxypropyne-1. |
| Do | Tetraethyl orthothiocarbonate | 1-Cyclohexyl-3,3,3-trithioethylpropyne-1. |
| Do | Tricyclohexyl orthoformate | 1-Cyclohexyl-3,3-dicyclohexyloxypropyne-1. |
| Acetylene | Triethyl orthohexahydrobenzoate. | 1-Cyclohexyl-3,3-diethoxypropyne-1 and 1,4 - Dicyclohexyl - 1,1,4,4 - tetraethoxybutyne-1. |
| n-Butylacetylene | ___do___ | 1-Cyclohexyl-2,2-diethoxyheptyne-2. |
| Phenylacetylene | ___do___ | 1 - Phenyl - 3,3 - diethoxy - 3 - cyclohexylpropyne-1. |
| Cyclohexyl-Acetylene | ___do___ | 1,3-Dicyclohexyl-3,3-diethoxypropyne-1. |
| Acetylene | Triethyl orthothiohexahydrobenzoate. | 1,4 - Dicyclohexyl - 1,1,4,4 - tetrathioethylbutyne - 2 and 3,3 - dithioethyl - 3 - cyclohexylpropyne-1. |
| n-Butyl-Acetylene | ___do___ | 1-Cyclohexyl-1,1-dithioethylheptyne-2. |
| Phenylacetylene | ___do___ | 1 - Phenyl - 3,3 - dithioethyl - 3 - cyclohexylpropyne-1. |
| Cyclohexylacetylene | ___do___ | 1 - Cyclohexyl - 3,3 - dithioethyl - 3 - cyclohexylpropyne-1. |

Catalysts useful in the practice of this invention are salts of magnesium, zinc, mercury, and cadmium. Especially useful are the iodides, halides, nitrates, and sulfates of these metals. In place of these or in conjunction therewith there may be used salts of these metals with organic acids, such as the formates, acetates, benzoates, propionates, and hexahydrobenzoates.

The amount of catalyst employed will generally be between 0.01% and 15% or more, based on the amount of alkyne charged into the reactor.

The operating range of temperature will be between 0° C. and 200° C. Usually, however, temperatures ranging from 40–150° C. are used because the best yields, with minimum amount of side reaction product formation, are obtained within this temperature range.

The process is operated at autogenous pressures under the temperature conditions employed, except when acetylene itself is used when it is preferred to operate under gauge pressures up to 300 lb./sq. in. If desired, however, external pressures up to 100 atmospheres may be applied but this is usually not desirable because it increases costs and adds to operating difficulties.

The use of a reaction medium is unnecessary and in many cases undesirable. However, suitable media include dioxane, cyclohexane, benzene, toluene, isooctane, and the like. The amount of reaction medium may be less than, equal to, or exceed the combined weights of alkyne and orthoester in the charge.

The new compounds claimed herein are the class of acetylenic acetals and thioacetals represented by the formula

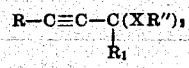

wherein R is hydrogen or aliphatically saturated monovalent hydrocarbon, $R_1$ and R'' are aliphatically saturated monovalent hydrocarbon radicals, and X is a chalcogen of atomic weight less than 33, i. e., oxygen or sulfur.

The acetals of this invention are generally useful as intermediates for the synthesis of polymerizable monomers. Selective hydrogenation yields olefinically unsaturated acetals which can be copolymerized with vinyl compounds to produce copolymers which in themselves are useful in the plastics and protective coating arts, and which can also be used to modify other polymers to provide acetal reactive groups. Hydrolysis of these acetals yields acetylenic ketones which are highly versatile chemical intermediates by virtue of their acetylenic and ketonic nature. Vinylation of the acetals with acids, thiols, and alcohols yields compounds possessing valuable properties, and reaction with hydroxylated polymers, such as cellulose, imparts crease- and crush-proofing properties to such polymers.

Since many different embodiments of the invention may be made without departing from the spirit and scope thereof, it is to be understood that the invention is not limited by the specific illustrations except to the extent defined in the following claims.

What is claimed is:

1. An acetylenic acetal of the general formula:

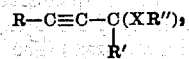

wherein R' and R'' are members of the group consisting of lower alkyl and cyclohexyl, R is a member of the group consisting of hydrogen, lower alkyl, cyclohexyl and phenyl, and X is a chalcogen of atomic weight less than 33.

2. The process for preparing alkynyl acetals and orthoesters which comprises reacting an alkyne of the formula R—C≡CH with an orthoester of the formula

in the presence of a catalyst selected from the group consisting of the halides, nitrates, sulfates, molybdites and carboxylates containing 1–18 carbon atoms of a metal of the group consisting of magnesium, mercury, zinc and cadmium, and wherein R and R' are selected from the group consisting of hydrogen, lower alkyl, cyclohexyl and phenyl, R'' is selected from the group consisting of lower alkyl and cyclohexyl, X is a chalcogen of atomic weight less than 33, and $n$ is a plural integer up to 3.

3. A process as defined in claim 2 wherein at least 0.01% of catalyst is used, based on the amount of alkyne.

4. A process as defined in claim 2 wherein the reaction is conducted at a temperature of 0° to 200° C.

References Cited in the file of this patent

UNITED STATES PATENTS

| | | |
|---|---|---|
| 2,412,814 | Kendall et al. | Dec. 17, 1946 |
| 2,707,714 | Conklin et al. | May 3, 1955 |

OTHER REFERENCES

Piganiol, Acetylene Homologs and Derivatives, page 262 (1950), Mapleton House, 5415, 17th Avenue, Brooklyn 4, New York.